US008578970B2

(12) United States Patent
Kennedy et al.

(10) Patent No.: US 8,578,970 B2
(45) Date of Patent: Nov. 12, 2013

(54) PRESSURE-COMPENSATED ACCUMULATOR BOTTLE

(75) Inventors: Mac M. Kennedy, Houston, TX (US); Scott D. Ward, Houston, TX (US); Thomas M. Bell, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/587,871

(22) Filed: Aug. 16, 2012

(65) Prior Publication Data

US 2012/0305120 A1 Dec. 6, 2012

Related U.S. Application Data

(62) Division of application No. 12/669,038, filed as application No. PCT/US2008/075607 on Sep. 8, 2008, now Pat. No. 8,291,938.

(60) Provisional application No. 60/993,110, filed on Sep. 10, 2007.

(51) Int. Cl.
*F16L 55/04* (2006.01)

(52) U.S. Cl.
USPC .................................. 138/31; 138/30; 137/14

(58) Field of Classification Search
USPC .............. 138/26, 30, 31; 137/14, 511; 251/62
See application file for complete search history.

(56) References Cited

U.S. PATENT DOCUMENTS

| | | | | |
|---|---|---|---|---|
| 2,880,746 | A | 4/1959 | Bernotas | |
| 3,336,948 | A | 8/1967 | Lucien | |
| 3,424,202 | A | 1/1969 | Linicome | |
| 4,343,477 | A | 8/1982 | Bridges | |
| 4,527,580 | A * | 7/1985 | Chheda | 137/1 |
| 4,611,634 | A | 9/1986 | Kruckewitt et al. | |
| 4,765,366 | A | 8/1988 | Premiski et al. | |
| 5,127,712 | A | 7/1992 | Rizk et al. | |
| 2002/0175303 | A1 | 11/2002 | Chatufale | |
| 2012/0103452 | A1 | 5/2012 | Toyohira et al. | |

FOREIGN PATENT DOCUMENTS

| | | |
|---|---|---|
| GB | 820397 | 9/1959 |
| GB | 2155105 | 9/1985 |
| WO | WO2007030017 | 3/2007 |

OTHER PUBLICATIONS

PCT International Search Report and Written Opinion for PCT/US2008/075607, dated Jan. 12, 2009.

* cited by examiner

*Primary Examiner* — Patrick F Brinson
(74) *Attorney, Agent, or Firm* — Fletcher Yoder, P.C.

(57) ABSTRACT

A pressure-compensated accumulator bottle is provided. In one embodiment, the accumulator bottle includes a housing and an interior wall that generally define first, second, and third chambers within the housing. In this embodiment, a spring is disposed in the second chamber and configured to apply a biasing force on a first piston disposed within the first chamber. Further, in this embodiment, an additional piston is disposed within the third chamber and is configured to facilitate balancing of the pressure of a fluid disposed in the second chamber with the pressure of the external environment such that the magnitude of a second biasing force applied on the first piston by the pressure of the fluid depends at least in part on the pressure of the external environment. Hydraulic circuits and systems including a pressure-compensated accumulator bottle are also disclosed.

20 Claims, 7 Drawing Sheets

PRESSURE-COMPENSATED ACCUMULATOR BOTTLE

CROSS-REFERENCE TO RELATED APPLICATIONS

This application claims priority to and benefit of U.S. patent application Ser. No. 12/669,038, entitled "Pressure-Compensated Accumulator Bottle," filed Jan. 13, 2010, which is herein incorporated by reference in its entirety, which claims priority to and benefit of PCT Patent Application No. PCT/US2008/075607, entitled "Pressure-Compensated Accumulator Bottle," filed Sep. 8, 2008, which is herein incorporated by reference in its entirety, and which claims priority to and benefit of U.S. Provisional Patent Application No. 60/993,110, entitled "Pressure-Compensated Accumulator Bottle", filed on Sep. 10, 2007, which is herein incorporated by reference in its entirety.

FIELD OF THE INVENTION

The present invention relates generally to pressure regulation within a system. More particularly, the present invention relates to a novel pressure-compensated accumulator bottle for such systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, supplies of oil and natural gas have a profound effect on modern economies and civilizations. Devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for these resources, companies often spend a significant amount of time and money searching for and extracting oil, natural gas, and other subterranean resources from the earth. Particularly, once a desired resource is discovered below the surface of the earth, a drilling system is often employed to access and extract the resource. These drilling systems may be located onshore or offshore depending on the location of a desired resource. Further, such systems include a wide array of components, such as valves, that control drilling or extraction operations. Often, some of these components are controlled through pressure variation, such as that provided by a hydraulic control system.

As may be appreciated, hydraulic systems often include accumulator bottles that facilitate operation of the system. Generally, these accumulator bottles may be used to store pressurized hydraulic fluid in a hydraulic circuit; the accumulator bottle typically receives hydraulic fluid from the circuit in low-demand periods and returns the hydraulic fluid to the circuit as needed to supplement flow and pressure within the system. In many instances, a typical accumulator bottle will include a first chamber that communicates with the hydraulic circuit and a second chamber that contains a pressurized gas. As will be appreciated, the pressure setting of the gas is known as a "pre-charge", and generally controls the amount of energy which may be stored by the accumulator bottle. Excessive pre-charge pressure may prevent the accumulator bottle from receiving hydraulic fluid, while insufficient pressure may not provide enough energy to force such fluid back into the hydraulic circuit when needed. Further, the amount of pre-charge desired generally depends on the ambient pressure in which the accumulator bottle is intended to operate. Consequently, movement of a typical accumulator bottle from one ambient pressure to another (e.g., between different operational depths) would often necessitate an adjustment to the pre-charge.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to a novel pressure-compensated accumulator bottle. In certain embodiments, the accumulator bottle includes a housing and internal components that generally divide the interior of the housing into a plurality of regions for receiving fluids. For instance, in some embodiments, the interior of the accumulator bottle includes a first region for receiving a hydraulic fluid, a second region for receiving a pressure compensation oil, and a third region for receiving fluid from the ambient environment in which the accumulator bottle is disposed. In some of these embodiments, a first piston generally divides the first and second regions, and generally cooperates with a spring within the housing to regulate flow of hydraulic fluid in and out of the first region. Additionally, in at least one embodiment, a second, floating piston generally divides the second and third regions and facilitates automatic pressure-compensation of the accumulator bottle via compression of the pressure compensation oil in the second region in response to ambient pressure in the third region. Other embodiments, however, may include a greater or lesser number of such regions for providing this pressure-compensation functionality. Further, additional embodiments of the present invention may also include various hydraulic circuits and systems including such an accumulator bottle.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
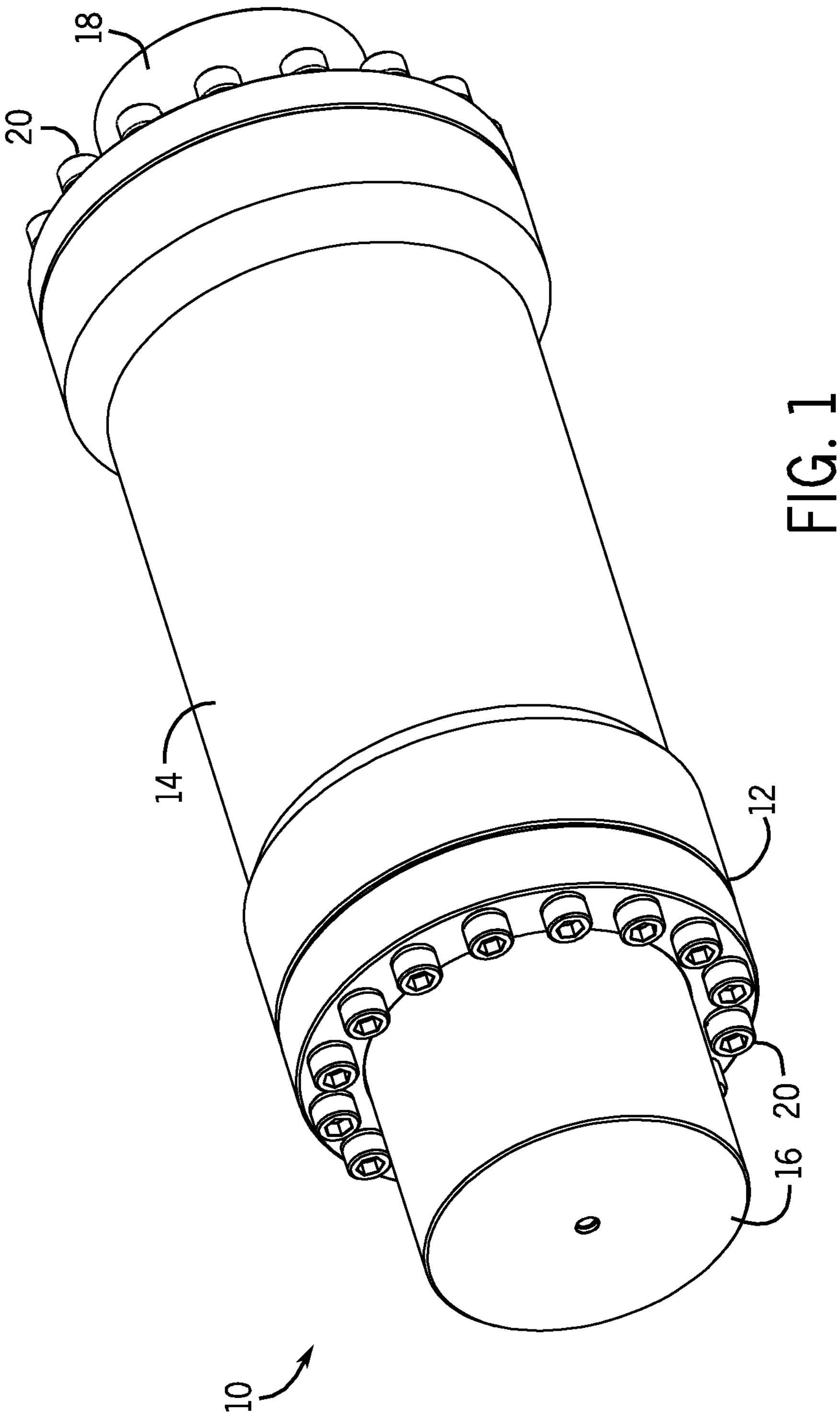
FIG. 1 is a perspective view of an exemplary pressure-compensated accumulator bottle in accordance with one embodiment of the present invention.

Turning now to the present figures, an exemplary accumulator bottle 10 is illustrated in FIG. 1 in accordance with one embodiment of the present invention. In this presently illustrated embodiment, the accumulator bottle 10 comprises a housing 12 configured to receive and store hydraulic fluid, as discussed in greater detail below. The housing 12 includes a hollow central body 14, to which end caps 16 and 18 are coupled. The end caps 16 and 18 may be secured to the central body 14 via bolts 20, as illustrated in FIG. 1, or in any other suitable manner, including through the use of other fasteners, welding, or the like. The body 14 and end caps 16 and 18 may be formed of steel or some other high-strength material.

Figure 2:
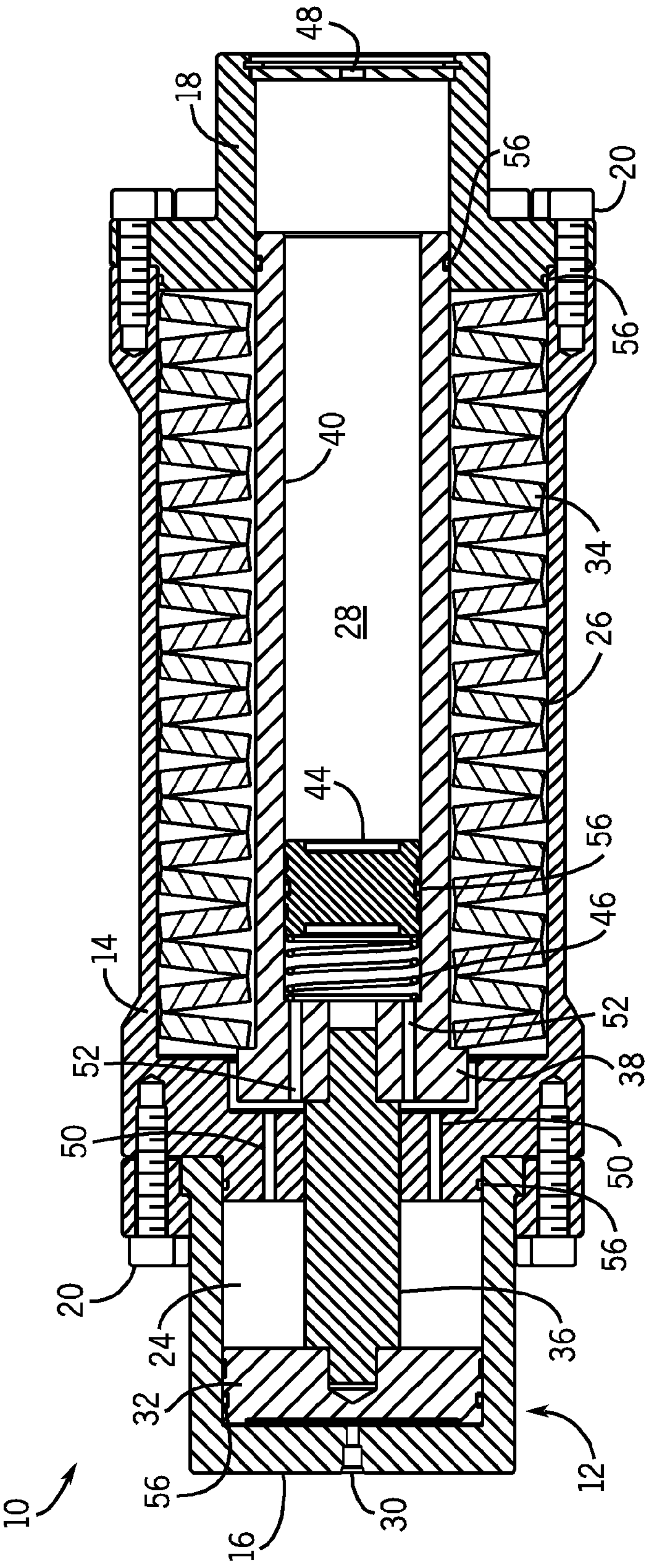
FIG. 2 is a cross-sectional view of the accumulator bottle of FIG. 1, illustrating exemplary internal components of the accumulator bottle in accordance with one embodiment of the present invention.

Various internal components and features of the accumulator bottle 10 may be better understood with reference to the cross-sectional view of FIG. 2. In the presently illustrated embodiment, the housing 12 of the accumulator bottle 10 includes a plurality of chambers, such as chambers 24, 26, and 28, for receiving various fluids. For instance, in one embodiment, the accumulator bottle 10 may be coupled to a hydraulic circuit or system via an aperture 30 in the end cap 16, through which the chamber 24 may receive hydraulic fluid. As discussed in greater detail below with respect to FIGS. 3-5, a piston 32 disposed within the chamber 24 isolates the hydraulic fluid from other regions within the housing 12 and controls flow of the hydraulic fluid in and out of the chamber 24 through the aperture 30. In certain embodiments, the piston 32 is biased toward the aperture 30 by a spring 34 disposed in the chamber 26. More specifically, in the presently illustrated embodiment, the spring 34 applies the biasing force to the piston 32 via a piston stem 36 and a flanged portion 38 of a wall or enclosure 40 disposed within the chamber 26. It should be noted that the spring 34 may include a washer-type spring, a coil spring, or the like. It should also be appreciated that the biasing force on the piston 32 may be provided through various other components and manners in full accordance with the present techniques.

Figure 3:
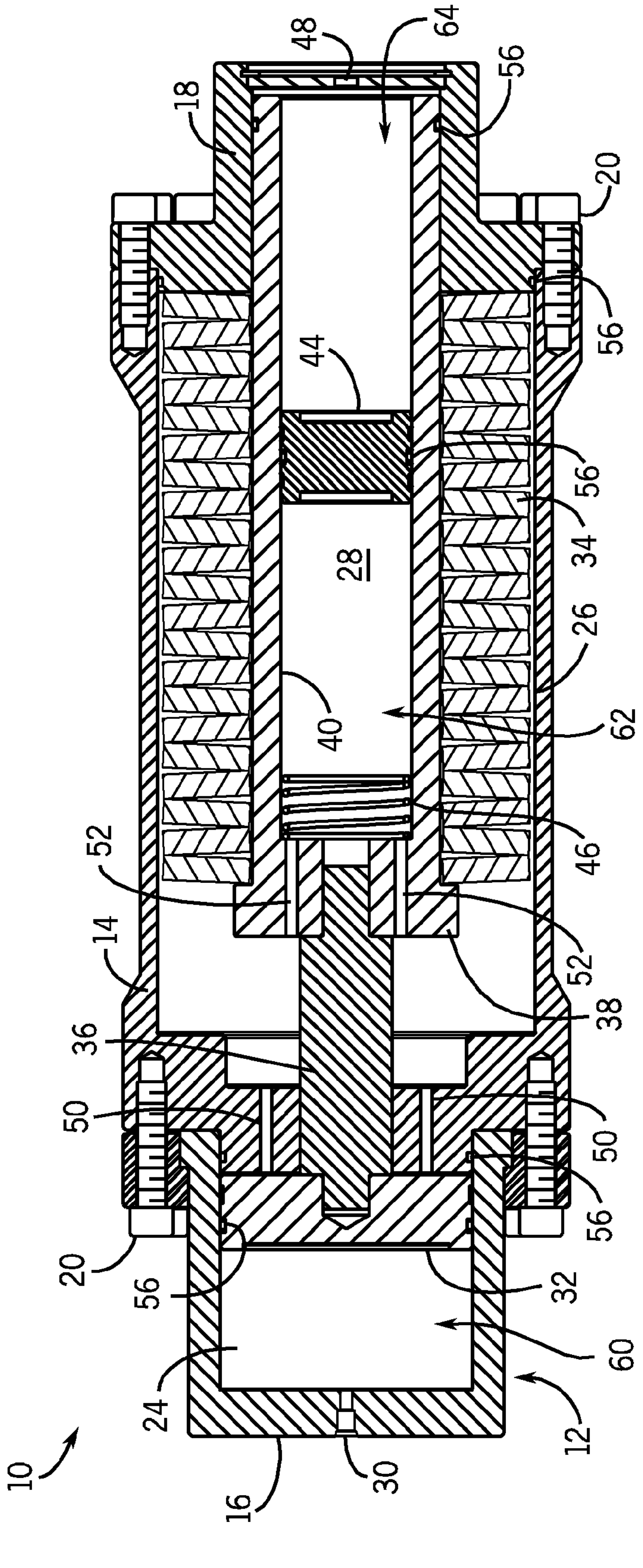
FIG. 3 is an additional cross-sectional view of the accumulator bottle of FIG. 2, illustrating the introduction of hydraulic fluid and operation of the accumulator bottle in accordance with one embodiment of the present invention.

The exemplary enclosure 40 generally defines the chamber 28 within the housing 12. In one embodiment, the enclosure is positioned within the central body 14 such that the chambers 26 and 28 are substantially coaxial, although other arrangements are also envisaged. The accumulator bottle 10 and its components may be configured to allow the enclosure 40 to undergo relative motion within the housing 12, such as generally illustrated in FIGS. 2 and 3, or the position of the enclosure 40 within the housing 12 may be fixed in one location. Notably, a piston 44 and spring 46 are disposed within the enclosure 40 to facilitate pressure compensation within the accumulator bottle 10, as discussed in greater detail below. The end cap 18 includes an aperture 48, which permits fluid communication between the chamber 28 and the environment external to the accumulator bottle 10.

In the presently illustrated embodiment, fluid ports 50 are provided through an internal partition of the housing 12 to allow fluid communication between the chambers 24 and 26, while fluid ports 52 allow fluid communication between the chambers 26 and 28. Pistons 32 and 44, however, generally prevent fluid communication between the chamber 26 and other hydraulic components via the aperture 30, or between the chamber 26 and the external environment through aperture 48. As will be appreciated, various seals 56 may be provided between components of the accumulator bottle 10 to reduce or prevent fluid transfer between different areas of the housing 12.

Figure 4:
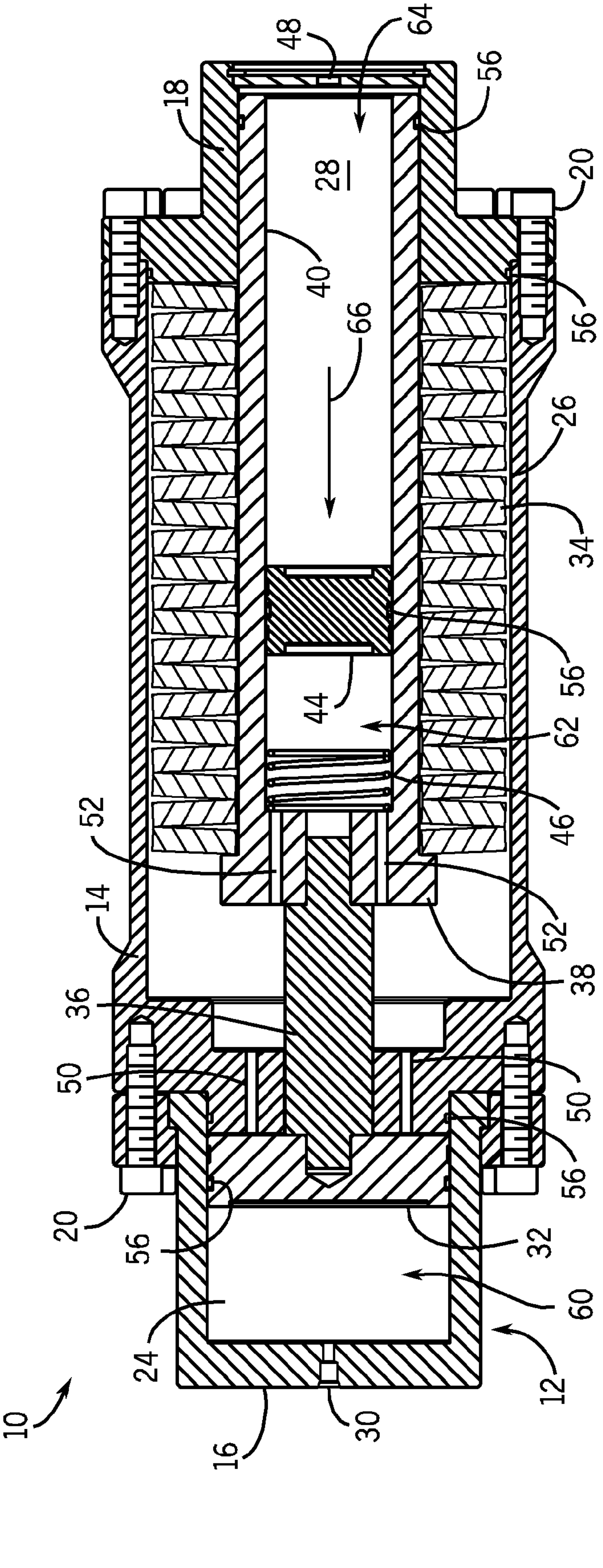
FIG. 4 is a cross-sectional view of the accumulator bottle of FIG. 3, depicting motion of a pressure-compensation piston upon an increase in ambient pressure in accordance with one embodiment of the present invention.
Figure 5:
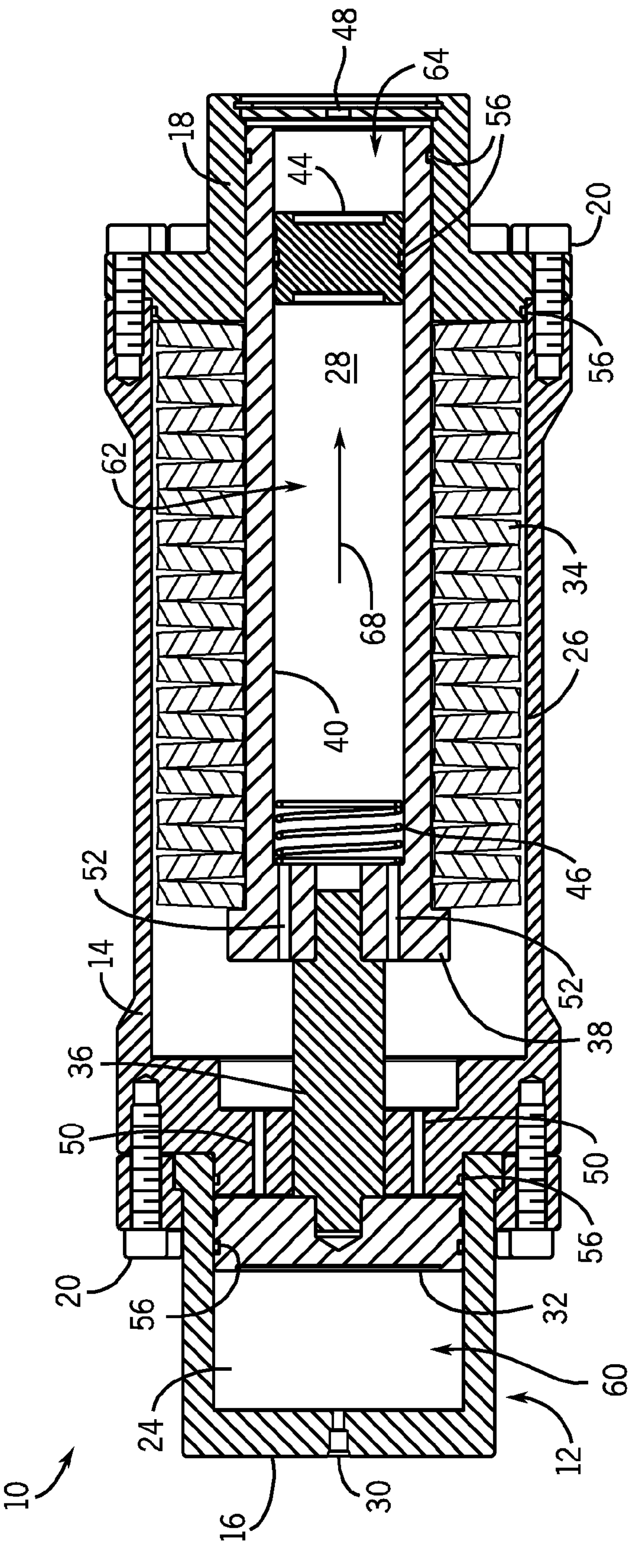
FIG. 5 is a cross-sectional view of the accumulator bottle of FIG. 3, depicting motion of the pressure-compensation piston upon a decrease in ambient pressure in accordance with one embodiment of the present invention.

During operation, and with reference to FIGS. 3-5, the housing 12 and the pistons 32 and 44 generally divide the interior of the exemplary accumulator bottle 10 into three regions that are in fluid isolation from one another. First, in the presently illustrated embodiment, region 60 corresponds to the interior portion of the housing 12 in fluid communication with the aperture 30, i.e., the volume of fluid within the chamber 24 between the aperture 30 and the piston 32. When coupled to a hydraulic circuit or system via the aperture 30, the region 60 will generally correspond to the portion of the chamber 24 containing hydraulic fluid. Region 62, in turn, includes the volume of chamber 26, as well as those portions of the chambers 24 and 28 that are in fluid communication with the chamber 26 via the fluid ports 50 and 52. Finally, region 64 corresponds to the enclosed volume of the chamber 28 generally located between the piston 44 and the aperture 48.

It should be noted that the relative volumes of the regions 60, 62, and 64 will change during operation depending on the position of the pistons 32 and 44. As hydraulic fluid is introduced into the region 60 via the aperture 30, pressure within the region 60 causes the piston 32 (and the enclosure 40 if coupled to the piston 32) to move from the position illustrated in FIG. 2 to that illustrated in FIG. 3. This movement translates into compression of the spring 34 within the chamber 26. As will be appreciated, the amount of energy stored in the compressed spring 34 is related to the amount the spring is compressed. Once the pressure within the region 60 is no longer sufficient to maintain the same amount of compression of the spring 34 (such as upon a drop in the pressure of a hydraulic circuit connected to the aperture 30), the spring 34 will push the piston 32 toward the aperture 30, thereby forcing hydraulic fluid out of the region 60 through the aperture 30.

Notably, in addition to the spring 34, the pressure of a fluid contained in the region 62 may also apply a biasing force on the piston 32. In some embodiments, this fluid may be a non-corrosive, low-compressibility oil that facilitates the use of less-expensive high-strength materials, such as steels, to form various internal components of the accumulator bottle 10, rather than more-expensive corrosion-resistant materials. Other fluids and materials, however, may instead be used within the region 62 in full accordance with the present techniques. While external fluids, such as water in subsea applications, are allowed to enter the region 64 through the aperture 48, the piston 44 prohibits fluid transfer between the regions 62 and 64. More specifically, in at least one embodiment, the piston 44 is a floating piston that moves within the chamber 28 in response to the ambient pressure of the environment in which the accumulator bottle 10 is disposed, allowing communication between the regions 62 and 64 without fluid transfer.

In one embodiment, the movement of the piston 44 is generally independent of the compression of the spring 34, thus allowing the amount of energy capable of being stored by the accumulator bottle 10 to vary according to environmental conditions even when the piston 32 is fully open within the chamber 24 and cannot further compress the spring 34. For instance, as the ambient pressure of the environment in which the accumulator bottle 10 is disposed increases, the pressure within the region 64 forces the piston 44 to travel in the direction indicated by arrow 66 in FIG. 4 either until the pressure on each side of the piston 44 is balanced (i.e., the piston 44 reaches an equilibrium state), or until the piston 44 reaches the spring 46. This movement of the piston 44 in the direction indicated by the arrow 66 further compresses the fluid within the region 62, resulting in an increased pressure within the region 62, an increased biasing force against the piston 32, and increased energy storage capacity for the accumulator bottle 10. Additionally, it should be noted that the spring 46 permits additional compressibility of the fluid within the region 62 over a greater range of ambient pressures above that which would cause the piston 44 to reach the spring 46. The spring 46 may also hold the piston 44 away from its travel-stop opposite the aperture 48 when the chamber 26 is vacuumed of air and filled with a fluid, such as the low-compressibility fluid noted above.

Alternatively, as illustrated in FIG. 5, the piston 44 may move in the direction indicated by arrow 68 upon a decrease in the ambient pressure of the external environment in which the accumulator bottle 10 is disposed, such as that which would generally occur upon moving the accumulator bottle 10 from a deeper position in a subsea application to a more shallow position. This movement of the piston 44 toward the aperture 48 increases the volume of the region 62 and decreases the pressure of the fluid therein. Consequently, the biasing force on the piston 32 is reduced along with the energy storage capacity of the accumulator bottle 10, allowing for more efficient operation of a hydraulic circuit to which the accumulator bottle 10 is connected.

Consequently, in one embodiment, this ambient pressure-over-springs design of the exemplary accumulator bottle 10 facilitates automatic adjustment of the energy storage capacity of the accumulator bottle 10 in response to the ambient pressure in which it is disposed. Notably, this self-adjustment of the pressure-compensated accumulator bottle 10 facilitates its optimal use over a wide range of ambient pressures and operational depths, while reducing or eliminating the need for time-consuming pre-charge maintenance or adjustment of accumulator bottles for different operating depths or conditions. This, in turn, results in reduced manufacturing and maintenance costs for systems employing the accumulator bottle 10. Additionally, the floating piston 44 provides further pressure compensation functionality by accommodating the expansion of fluid within the region 62 upon an increase in the ambient temperature. It should also be noted that while certain embodiments of the accumulator bottle 10 may comprise other components in addition to the components explicitly discussed above (e.g., the housing 12, the pistons 32 and 44, the springs 34 and 46, and the like), other embodiments in accordance with the present techniques may consist of, or consist essentially of, these components or some sub-combination thereof.

Figure 6:
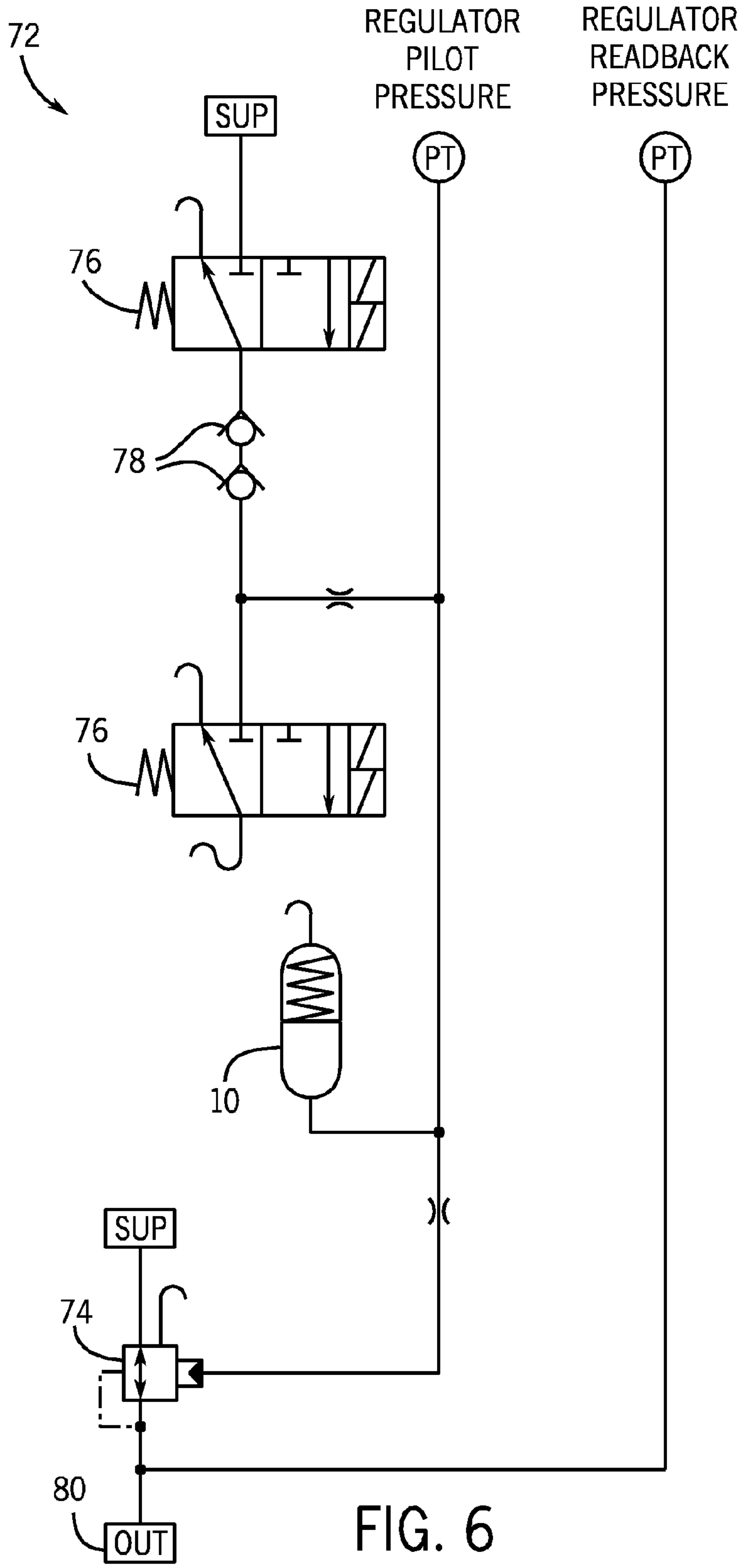
FIG. 6 is a schematic view of an exemplary hydraulic circuit containing the accumulator bottle of FIGS. 1-5 in accordance with one embodiment of the present invention.

An exemplary hydraulic circuit 72 including an accumulator bottle 10 is depicted in FIG. 6. The hydraulic circuit 72 includes a pressure regulator 74 that may be controlled by various other components, such as solenoid valves 76. Additional components, such as check valves 78, may be included with the solenoid valves 76 and the accumulator bottle 10 to control flow of hydraulic fluid through the circuit 72. As will be appreciated, the pressure regulator 74 controls the output pressure to various downstream components, as generally depicted at output 80.

Figure 7:
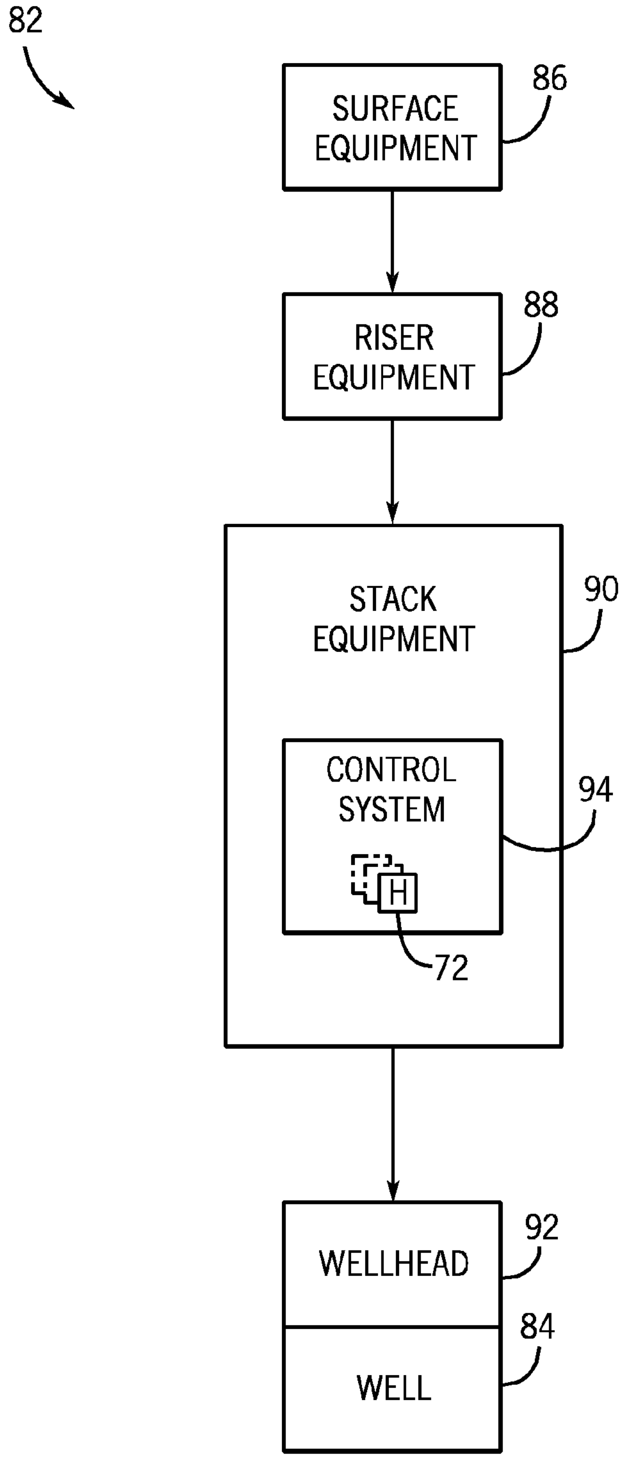
FIG. 7 is a block diagram of an exemplary resource extraction system having one or more of the hydraulic circuits of FIG. 6 in accordance with one embodiment of the present invention.

In some embodiments, one or more hydraulic circuits 72 may be integrated into a larger system, such as the exemplary drilling system 82 of FIG. 7. Notably, the drilling system 82 facilitates extraction of a resource, such as oil or natural gas, from a well 84. The system 82 includes a variety of equipment, including surface equipment 86, riser equipment 88, and stack equipment 90, for extracting the resource from the well 84 via a wellhead 92. The exemplary system 82 may be employed in a variety of drilling or extraction applications, including onshore and subsea drilling applications. In one subsea application, the surface equipment 86 is mounted to a drilling rig above the surface of the water, the stack equipment 90 is coupled to the wellhead 92 near the sea floor, and the various equipment 86 and 90 is coupled to one another via the riser equipment 88. As will be appreciated, the riser equipment 88 facilitates transmission of the extracted resource to the surface equipment 86 from the stack equipment 90 and the well 84.

The stack equipment 90 may include a number of components, such as blowout preventers and/or production or “Christmas” trees, for extracting the desired resource from the wellhead 92. In the presently illustrated embodiment, operation of the stack equipment 90 is controlled by an exemplary control system 94. The exemplary control system 94 includes one or more hydraulic circuits 72, each having at least one accumulator bottle 10 and controlling flow through the system 82. In some embodiments, the control system 94 includes one or more control pods of a blowout preventer.

It will be appreciated that, traditionally, multiple accumulator bottles may have been employed for each hydraulic circuit of a control pod to enable operation of the circuit over a small range of operating depths (e.g., a 200-foot range); any variation outside of this limited range would generally necessitate adjustment of the pre-charge level in such accumulator bottles. In at least one embodiment of the present invention, however, the pressure-compensating design of the exemplary accumulator bottle 10 allows fewer bottles 10 to be used as the accumulator bottles in each hydraulic circuit, as generally illustrated in FIG. 6, while allowing operation of the hydraulic circuit over a substantially greater range of operating depths, such as a 500-foot range, a 700-foot range, a 1,000-foot range, or even greater, without adjusting a pre-charge level in the accumulator bottles 10. Indeed, in one embodiment, a single accumulator bottle 10 may be included in each hydraulic circuit to provide the greater range of operating depths, including those noted immediately above. Consequently, the pressure-compensated design of the accumulator bottle 10 may greatly reduce the number of accumulator bottles necessary for operation of a hydraulic circuit 72 over a wider range of operating depths and conditions. Of course, it will be appreciated by one skilled in the art that the accumulator bottle 10 may be employed in a wide array of systems and/or hydraulic circuits different than those in FIGS. 6 and 7.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:

a pressure regulator; and an accumulator bottle in fluid communication with the pressure regulator, the accumulator bottle comprising:

a housing including:

a hydraulic fluid chamber configured to receive a first fluid comprising a hydraulic fluid;

a pressure compensation chamber configured to receive a second fluid; and an ambient pressure chamber configured to receive a third fluid from an environment in which the accumulator bottle is disposed;

a first piston disposed in the hydraulic fluid chamber and configured to divide the hydraulic fluid chamber into a first region containing the first fluid and a second region in fluid communication with the pressure compensation chamber; and a second piston disposed in the ambient pressure chamber and configured to divide the ambient pressure chamber into a third region containing the third fluid and a fourth region in fluid communication with the pressure compensation chamber, wherein the second piston is configured to balance the pressure of the second fluid and the third fluid such that a biasing force applied to the first piston by the pressure of the second fluid is self-regulated by the accumulator bottle based at least in part on the ambient pressure of the environment in which the accumulator bottle is disposed.

2. The system of claim 1, comprising a hydraulic circuit including the pressure regulator and the accumulator bottle, wherein the hydraulic circuit comprises only one accumulator bottle.

3. The system of claim 1, wherein the accumulator bottle includes a spring disposed in the pressure compensation chamber and configured to apply an additional biasing force to the first piston.

4. The system of claim 1, wherein the accumulator bottle includes a spring disposed in the ambient pressure chamber and configured to apply a biasing force to the second piston.

5. The system of claim 1, comprising an oil production system.

6. The system of claim 1, comprising:

the first fluid disposed in the first region;

the second fluid disposed in the pressure compensation chamber, the second region, and the fourth region; and the third fluid disposed in the third region.

7. The system of claim 1, comprising a control system having a plurality of regulator pilot circuits, wherein each regulator pilot circuit of the plurality of regulator pilot circuits comprises a pressure regulator and no more than one accumulator bottle per pressure regulator.

8. A method comprising:

providing a pressure-compensated accumulator bottle configured to store energy in a hydraulic circuit, wherein the pressure-compensated accumulator bottle is configured such that an energy storage capacity of the pressure-compensated accumulator is self-regulated and varies with respect to an ambient pressure in which the accumulator bottle is disposed;

coupling the pressure-compensated accumulator bottle to the hydraulic circuit;

operating the hydraulic circuit with the pressure-compensated accumulator bottle located at a first subsea depth;

moving the pressure-compensated accumulator bottle to a second subsea depth substantially different than the first subsea depth without servicing the pressure-compensated accumulator bottle; and operating the hydraulic circuit with the pressure-compensated accumulator bottle located at the second subsea depth.

9. The method of claim 8, wherein the pressure-compensated accumulator bottle is the only accumulator bottle coupled to the hydraulic circuit.

10. The method of claim 8, wherein the first subsea depth differs from the second subsea depth by more than 200 feet.

11. The method of claim 8, wherein the pressure-compensated accumulator bottle comprises a first chamber, a second chamber, a piston disposed in the first chamber, a spring disposed in the second chamber and configured to apply a biasing force on the piston, and an interior wall disposed within the second chamber and defining a third chamber.

12. A system comprising:

a pressure regulator; and an accumulator bottle in fluid communication with the pressure regulator, the accumulator bottle comprising:

a first piston disposed within a first chamber;

a biasing element disposed within a second chamber to bias the first piston; and a second piston disposed within a third chamber between a first region in fluid communication with the second chamber and a second region in fluid communication with an external environment, wherein the second piston comprises a pressure compensation piston.

13. The system of claim 12, comprising a hydraulic circuit including the pressure regulator and the accumulator bottle, wherein the hydraulic circuit comprises only one accumulator bottle.

14. The system of claim 12, comprising a control system having a plurality of regulator pilot circuits, wherein each regulator pilot circuit of the plurality of regulator pilot circuits comprises a pressure regulator and no more than one accumulator bottle per pressure regulator.

15. The system of claim 12, comprising an oil production system.

16. The system of claim 12, wherein the second piston comprises a floating piston.

17. The system of claim 12, comprising an interior wall disposed within a housing, and the interior wall is coupled to, and movable with, the first piston.

18. The system of claim 12, wherein the second piston is configured to facilitate pressure equalization between a fluid within the accumulator bottle and the external environment.

19. The system of claim 12, wherein the accumulator bottle is configured to be self-adjusting to facilitate optimal operation at different ambient pressures, and the accumulator bottle does not require pre-charge maintenance for sub-sea operation at two depths substantially different than one another.

20. A method comprising:

providing a pressure-compensated accumulator bottle configured to store energy in a hydraulic circuit, wherein the pressure-compensated accumulator bottle is configured such that an energy storage capacity of the pressure-compensated accumulator is self-regulated and varies with respect to an ambient pressure in which the accumulator bottle is disposed; and coupling the pressure-compensated accumulator bottle to the hydraulic circuit, wherein the pressure-compensated accumulator bottle comprises a first chamber, a second chamber, a piston disposed in the first chamber, a spring disposed in the second chamber and configured to apply a biasing force on the piston, and an interior wall disposed within the second chamber and defining a third chamber.

* * * * *